United States Patent
Tani et al.

(10) Patent No.: US 8,142,610 B2
(45) Date of Patent: Mar. 27, 2012

(54) FILM PEELING METHOD AND FILM PEELING DEVICE FOR DISPLAY PANEL

(75) Inventors: Yoshiyuki Tani, Osaka (JP); Hiromitsu Sugiura, Kyoto (JP); Takao Hisazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 930 days.

(21) Appl. No.: 10/585,903

(22) PCT Filed: Jan. 18, 2005

(86) PCT No.: PCT/JP2005/000542
§ 371 (c)(1), (2), (4) Date: Jul. 13, 2006

(87) PCT Pub. No.: WO2005/070573
PCT Pub. Date: Aug. 4, 2005

(65) Prior Publication Data
US 2007/0151667 A1 Jul. 5, 2007

(30) Foreign Application Priority Data
Jan. 21, 2004 (JP) .................................. 2004-012637

(51) Int. Cl.
*B32B 38/10* (2006.01)
(52) U.S. Cl. .................... 156/715; 156/759; 156/924
(58) Field of Classification Search .................. 156/344, 156/584, 715, 759, 764, 924, 937; 29/426.3, 29/426.5
See application file for complete search history.

(56) References Cited

U.S. PATENT DOCUMENTS

| | | | | |
|---|---|---|---|---|
| 1,186,729 | A * | 6/1916 | Baker | 242/546.1 |
| 3,830,441 | A * | 8/1974 | McQuiston | 254/222 |
| 4,373,611 | A * | 2/1983 | Frederick | 186/64 |
| 5,466,325 | A * | 11/1995 | Mizuno et al. | 156/344 |
| 5,891,297 | A | 4/1999 | Stadtmueller | |
| 6,199,616 | B1 * | 3/2001 | Gillespie | 156/584 |
| 6,227,276 | B1 * | 5/2001 | Kim et al. | 156/584 |
| 6,258,666 | B1 * | 7/2001 | Mizutani et al. | 438/258 |
| 2004/0033651 | A1 | 2/2004 | Schermer | |

FOREIGN PATENT DOCUMENTS

| | | |
|---|---|---|
| CN | 2052140 | 1/1990 |
| DE | 37 00 615 | 7/1988 |
| DE | 198 08 931 | 9/1999 |

(Continued)

OTHER PUBLICATIONS

Machine Translation of Japanese Patent Publication 9-197394, publication date Jul. 1997.*

*Primary Examiner* — Mark A Osele
(74) *Attorney, Agent, or Firm* — Hamre, Schumann, Mueller & Larson, P.C.

(57) ABSTRACT

A film peeling device is provided that can easily peel off a film that has been firmly stuck on a display panel. The film peeling device is configured from a cylindrical motor roller (3) that has an effective length longer than the length of the short side of a face panel (7a) constituting a bulb (7) of a cathode ray tube and has a self-rotating function, a contact plate (4) disposed such that it fits closely with the surface of the motor roller (3), and toggle clamps (5) provided outside of the effective length of the motor roller (3), that press the contact plate (4) against the surface of the motor roller (3).

4 Claims, 10 Drawing Sheets

FOREIGN PATENT DOCUMENTS

| | | |
|---|---|---|
| JP | 2-250057 | 10/1990 |
| JP | 7-215577 | 8/1995 |
| JP | 9-197394 | 7/1997 |
| JP | 11-149871 | 6/1999 |
| JP | 2003-150093 | 5/2003 |
| WO | 02/32667 | 4/2002 |

* cited by examiner

FILM PEELING METHOD AND FILM PEELING DEVICE FOR DISPLAY PANEL

TECHNICAL FIELD

The present invention relates to a film peeling method and a film peeling device for peeling off a film stuck on a display panel of a display device such as a cathode ray tube (CRT), a liquid crystal display (LCD), or a plasma display panel (PDP).

BACKGROUND ART

In recent years, due to the growth of electronics technology and an increase in user needs, efforts to increase the size and image quality of television receivers have been advancing. In cathode ray tubes that deal with increased size and image quality of television receivers, in order to obtain a high quality color image, a resin film sometimes is stuck on the surface of a face panel (display panel). This resin film has various purposes, such as preventing the reflection of external light, and preventing the face panel from becoming electrically charged by high voltage (about 40 kV) generated when the television receiver is switched on.

As one example of resin film, an AR (anti-reflection: low reflection) film for preventing reflection of external light or a conducting film for preventing charging are coated on a PET (polyethylene terephthalate) film with a thickness of 100 μm to 250 μm, and an adhesive with a thickness of 20 μm to 50 μm is added. The adhesive used in this resin film is 99% acrylic polymer, and the remaining 1% is a solvent for adhesion. This resin film is stuck on the surface of the face panel of a cathode ray tube using a special applicator provided with a rubber roller.

A television receiver on which resin film has been stuck as described above, after its role in the marketplace is finished, is brought into a reprocessing plant, and is processed to be recycled. With respect to the face panel of the cathode ray tube, a path in which after attachment such as fluorescent material has been removed, it is crushed, and it can be recycled as a cathode ray tube again is already completed. Also, with respect to the resin film, in order to perform recycling it is necessary to delaminate the adhesive.

Conventionally, as a film peeling device for peeling off a film stuck on a display panel, film peeling devices with the below sort of configuration are known (for example, see JP H11-149871A).

Figure 10A:
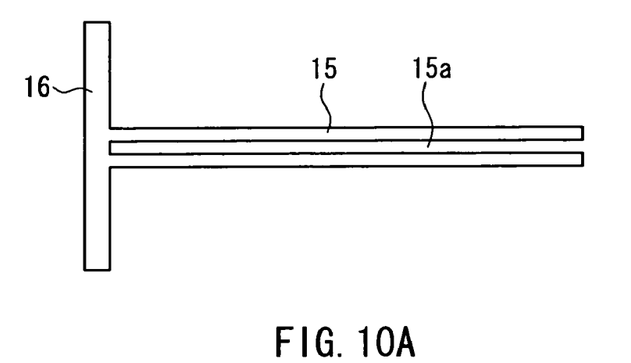
FIG. 10A is a side view that shows a conventional film peeling device.
Figure 10B:
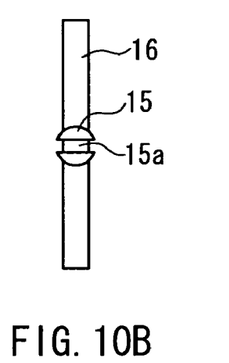
FIG. 10B is a front view that shows the film peeling device.
Figure 10C:
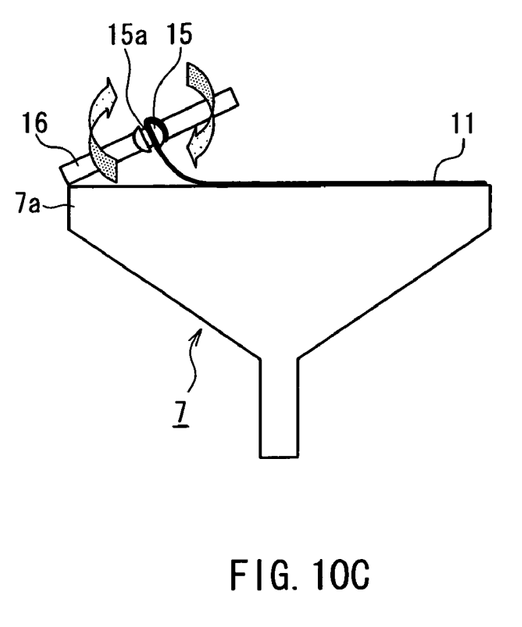
FIG. 10C shows a film peeling method using a conventional film peeling device, viewed from the side face side of a bulb.
Figure 10D:
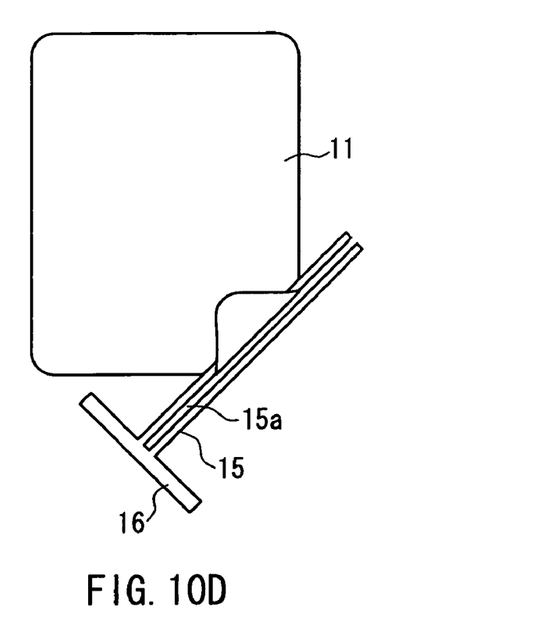
FIG. 10D shows the film peeling method, viewed from the front face side of the bulb.

FIG. 10A is a side view that shows a conventional film peeling device, and FIG. 10B is a front view of this film peeling device. FIG. 10C shows a film peeling method using a conventional film peeling device, viewed from the side of a bulb (envelope), and FIG. 10D shows this film peeling method, viewed from the front side of the bulb.

As shown in FIGS. 10A and 10B, a conventional film peeling device is configured from an approximately cylindrical main body portion 15 consisting of SUS (stainless steel) or iron pipe with a diameter of about 20 mm to 25 mm, and a handle portion 16 for rotating the main body portion 15. In the main body portion 15, a slit 15a is formed with a width of approximately 0.5 mm in order to grasp an end of a film 11 (see FIGS. 10C and 10D) in the lengthwise direction of the main body portion 15. When using this film peeling device, the film that has been stuck on the surface of the face panel of the cathode ray tube is peeled in the manner below. That is, as shown in FIGS. 10C and 10D, first, in the slit 15a that has been formed in the main body portion 15 of the film peeling device, 1 cm or more of the end of the film 11 stuck on the surface of a face panel 7a that constitutes a bulb 7 of the cathode ray tube is inserted, forming a "tongue". Next, by grasping a handle portion 16 and rotating the main body portion 15, the film 11 is rolled up in the main body portion 15.

DISCLOSURE OF INVENTION

Problem to be Solved by the Invention

However, with respect to PET film that has been stuck on the surface of the face panel of a cathode ray tube that has been recovered from the marketplace it is presumed that a cross-linking reaction of the adhesive will advance due to the passage of several years time or more. According to the results of accelerated test performed by the inventors of the present invention, the workload necessary for peeling off a film in a 32 inch cathode ray tube after 10 years is 5 N·m or more, and this is not a situation in which peeling can be performed by a worker using a manually operated device as described above.

The present invention was made in order to solve the problems in the conventional technology described above, and it is an object thereof to provide a film peeling method and a film peeling device with which it is possible to easily peel off a film that has been firmly stuck on the display panel.

Means for Solving Problem

To achieve the above object, a film peeling method for display panel according to the present invention includes peeling off an end of a film that has been stuck on a display panel, fixing the peeled end of the film to a roller that is adjacent to or in contact with a panel face of the display panel, and peeling off the film from the display panel by rotationally driving the roller.

Also, in the film peeling method of the present invention, it is preferable that by inserting the peeled end of the film between the surface of the roller and a contact plate disposed such that it fits closely with the surface of the roller, and pressing the contact plate against the surface of the roller, the peeled end of the film is fixed to the roller.

Also, a configuration of a film peeling device for display panel according to the present invention is provided with a rotationally drivable roller that has an effective length that is longer than the short side of a display panel, a contact plate disposed such that it fits closely with the surface of the roller, and a mechanism that presses the contact plate against the surface of the roller.

Also, in the configuration of the film peeling device of the present invention, it is preferable that the mechanism that presses the contact plate against the surface of the roller constitutes a pair of toggle clamps provided outside of the effective length of the roller.

Also, in the configuration of the film peeling device of the present invention, it is preferable that the roller is a motor roller that has a self-rotating function.

According to the present invention, it is possible for anyone to easily peel off a film that has been firmly stuck on the display panel reliably.

DESCRIPTION OF THE INVENTION

In order to reuse the glass resources of a display panel whose role in the marketplace is finished and has been recovered, it is necessary to peel off a film that has been stuck on the display panel. The inventors of the present invention invented a film peeling method and a film peeling device with which it is possible to peel off, easily and reliably, film that has been firmly stuck on the display panel.

Below, the present invention will be described more specifically using embodiments.

Figure 1A:
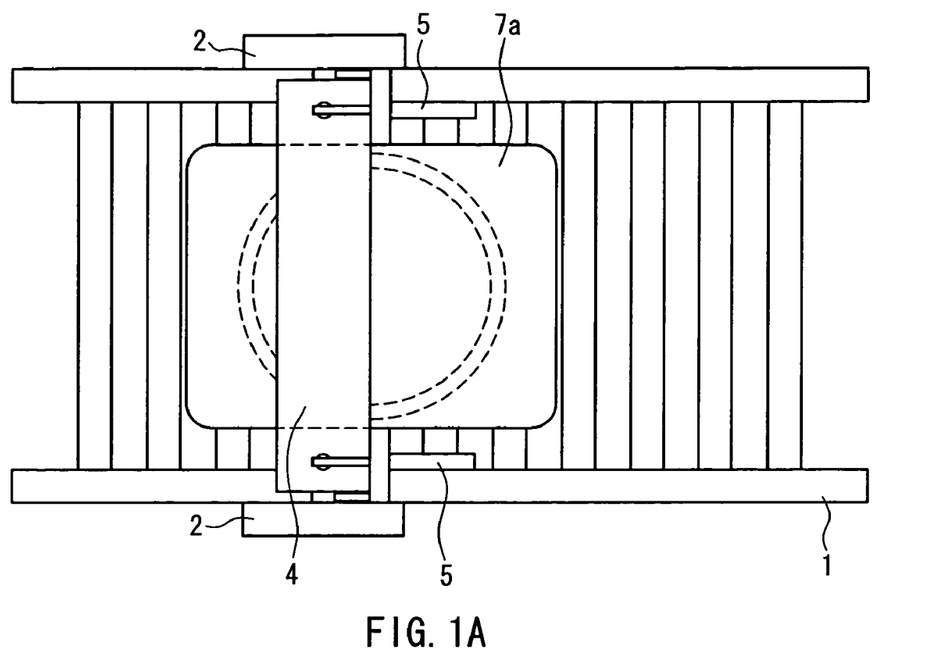
FIG. 1A is a plan view that shows a film peeling device according to one embodiment of the present invention.
Figure 1B:
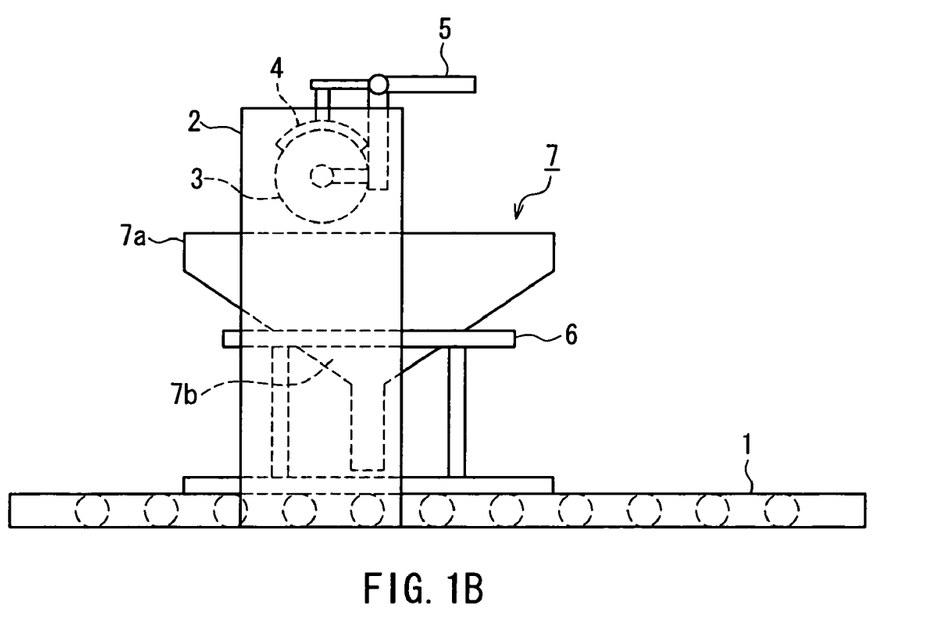
FIG. 1B is a side view that shows the film peeling device.

First is a description of a film peeling device according to the present invention with reference to FIG. 1. FIG. 1A is a plan view that shows a film peeling device according to one embodiment of the present invention, and FIG. 1B is a side view that shows the film peeling device.

As shown in FIGS. 1A and 1B, the film peeling device according to this embodiment is configured from a transport system 1 in which a bulb 7 of a cathode ray tube is transportable, a cylindrical motor roller 3 that has a rotation function disposed above the transport system 1, a contact plate 4 with an arc-shaped cross-section that has a curvature about the same as the curvature of the outer circumferential face of the motor roller 3, and a pair of toggle clamps 5 for pressing the contact plate 4 against the outer circumferential face of the motor roller 3, disposed near both ends of the contact plate 4. Here, the motor roller 3 and the contact plate 4 have an effective length that is longer than the short side of a face panel 7a. Also, as described below, a film 11 that is held sandwiched between the motor roller 3 and the contact plate 4 is peeled off while being rolled up in the motor roller 3, so that the pair of toggle clamps 5 are provided outside of the effective length of the motor roller 3.

Figure 3A:
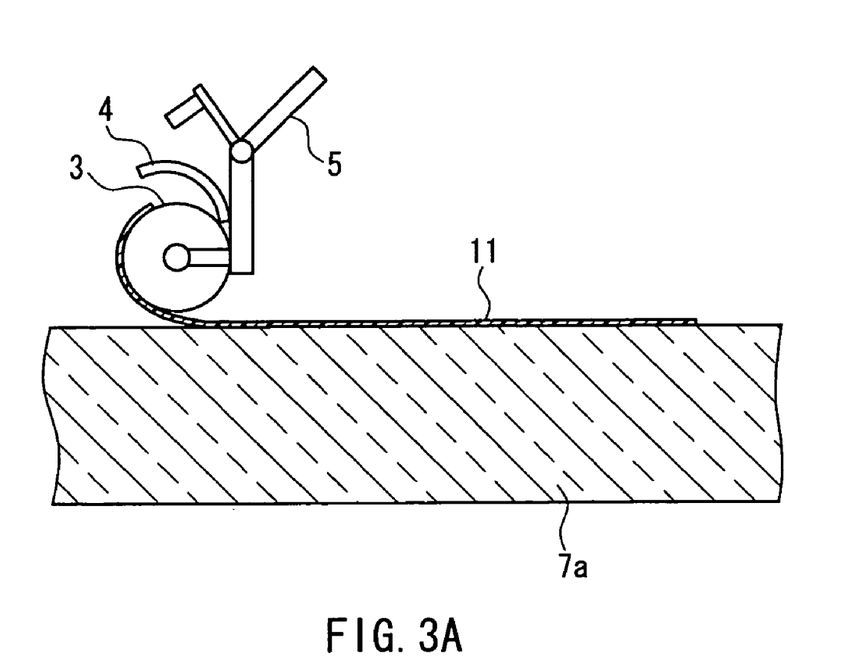
FIG. 3A is a side view that shows a state prior to grasping of a film grasping mechanism of a film peeling device according to one embodiment of the present invention.
Figure 3B:
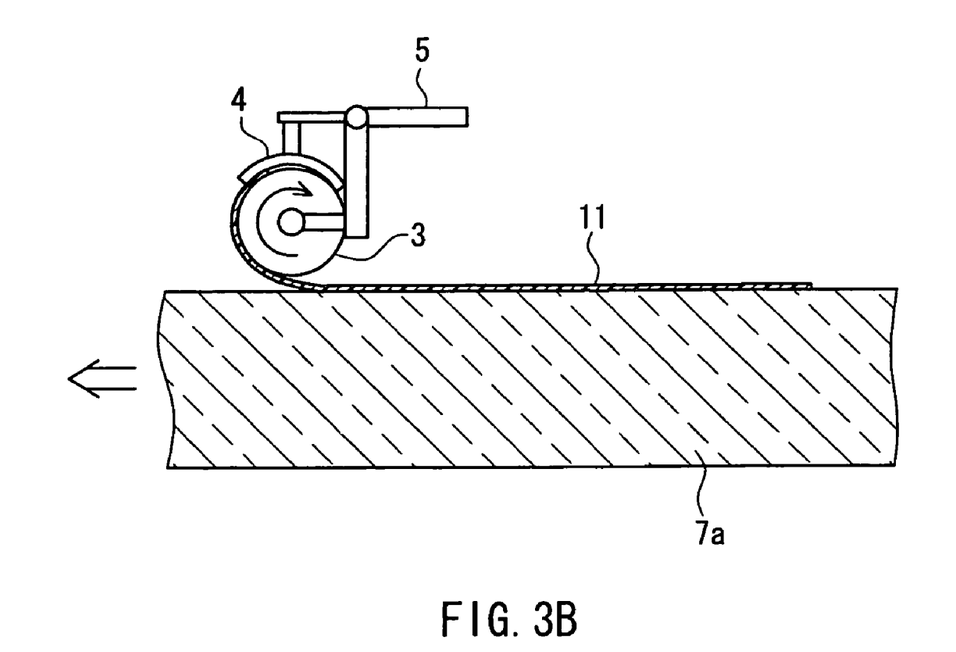
FIG. 3B is a side view that shows a state when the film grasping mechanism is grasping.

The motor roller 3 is supported in a horizontal state perpendicular to the transport direction of the bulb 7 by portal support pillars 2 provided at both sides of the transport system 1. The contact plate 4 has a structure in which one side of the contact plate 4 is fixed to the motor roller 3 using a hinge, and only the opposite side can be opened and closed (see FIG. 3).

The bulb 7 is mounted to the transport pallet 6 in a state with the face panel 7a on top, and transported on the transport system 1. When the bulb 7 has been transported to the position of the motor roller 3, the motor roller 3 is adjacent to or in contact with the panel face of the face panel 7a.

Figure 2A:
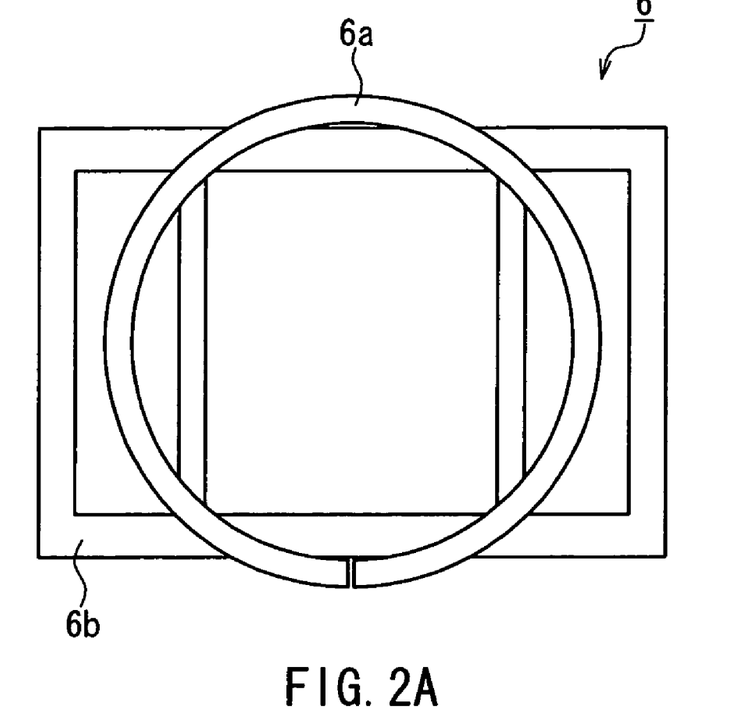
FIG. 2A is a plan view that shows a transport pallet of a film peeling device according to one embodiment of the present invention.
Figure 2B:
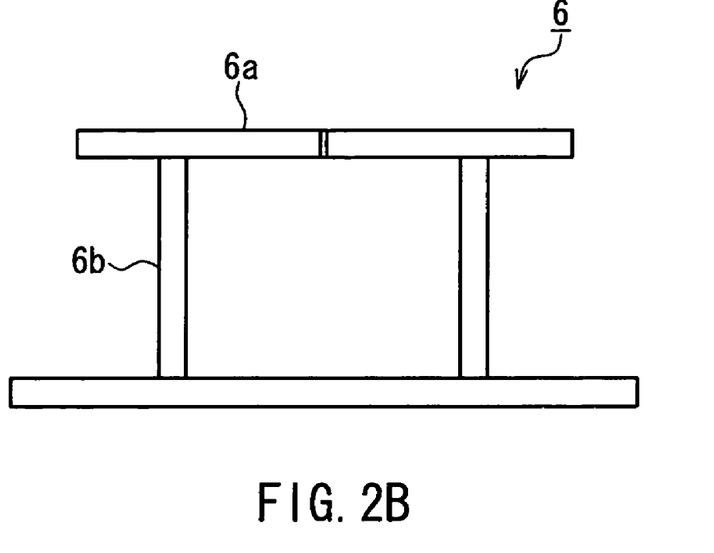
FIG. 2B is a side view that shows the transport pallet.

FIG. 2 shows the configuration of the transport pallet (FIG. 2A is a plan view, and FIG. 2B is a side view). As shown in FIG. 2, a transport pallet 6 has a simple structure in which a pipe (a round pipe) 6a formed bent in a round shape is merely fixed to a frame 6b in a horizontal state. The round pipe 6a of the transport pallet 6, by making contact with an inclined face of a funnel 7b of the bulb 7, can hold any size of bulb 7 in a state with the face panel 7a on top. Because the bulb 7 has a great deal of weight, even if a no special means for fixing the bulb 7 to the transport pallet 6 is provided, it is possible to fix the bulb 7 to some extent.

Next is a description of a film end grasping method with reference to FIG. 3. FIG. 3A is a side view that shows a state prior to grasping of a film grasping mechanism of a film peeling device according to one embodiment of the present invention, and FIG. 3B is a side view that shows a state when the film grasping mechanism is grasping. In the state prior to grasping in FIG. 3A, because the toggle clamps 5 are in an opened state, the side (the left side in FIG. 3A) of the contact plate 4 that is not fixed with the hinge is in a state in which it can easily be opened and closed. The end of the film 11 that has been peeled off is inserted between the motor roller 3 and the contact plate 4 by a worker. Afterward, as shown in FIG. 3B, by fastening the toggle clamps 5, the contact plate 4 is pressed against the outer circumferential face of the motor roller 3, and the end of the film 11 is grasped by the contact plate 4 and the outer circumferential face of the motor roller 3.

Next is a description of the film peeling method in the present embodiment with reference to FIGS. 1 to 3.

A television receiver that a consumer has finished using is brought into a reprocessing plant, and the bulb 7 is removed manually. The bulb 7 is mounted to the transport pallet 6 on the transport system 1 in a state with the face panel 7a on top, and transported to the position of the motor roller 3 (the state in FIGS. 1A and 1B). Then, several centimeters of the film 11 are peeled from the short side of the face panel 7a by a worker, and the peeled end of the film 11 is inserted between the motor roller 3 and the contact plate 4 by the worker (the state in FIG. 3A). Next, the toggle clamps 5 are fastened by the worker. Thus, the contact plate 4 is pressed against the outer circumferential face of the motor roller 3, and the end of the film 11 is grasped by the contact plate 4 and the outer circumferential face of the motor roller 3 (the state in FIG. 3B). When peeling off the end of the film 11, the end of the film 11 can be peeled effectively if an electrical tool that has a chisel-like blade edge and can move back and forth in the direction perpendicular to the blade edge is used.

When the end of the film 11 is grasped by the contact plate 4 and the outer circumferential face of the motor roller 3 as described above, a switch for the motor roller 3 is turned on, rotationally driving the motor roller 3 (see the arrow→in FIG. 3B). Thus, while the bulb 7 (the face panel 7a in FIG. 3B) moves on the transport system 1 in the direction of the arrow ⇒in FIG. 3B, the film 11 is rolled up in the motor roller 3, and peeled from the face panel 7a.

After being converted to only glass material, the bulb 7 is divided into the face panel 7a, which does not include lead, and the funnel 7b, which contains lead, and the face panel 7a and the funnel 7b respectively can be regenerated as the bulb of a television receiver again.

If the film peeling device of the present embodiment is used, the film 11 that has been firmly stuck on the face panel 7a can be peeled by anyone easily and reliably. As a result, it is possible to achieve an improvement in the recycling efficiency of the bulb 7 of a cathode ray tube whose role in the marketplace is finished. Also, because it is thus possible to establish, with energy conservation, an earth friendly recycling method, such as a recycling method that conserves the global environment and effectively uses resources, the present invention has a high industrial value, and also a high value from the viewpoint of the global environment.

In the embodiment described above, the toggle clamps 5 were used to press the contact plate 4 against the outer circumferential face of the motor roller 3, but the present invention is not necessarily limited to that configuration. For example, a configuration may also be adopted in which the contact plate 4 is pressed against the outer circumferential face of the motor roller 3 using a cylinder apparatus.

Figure 4:
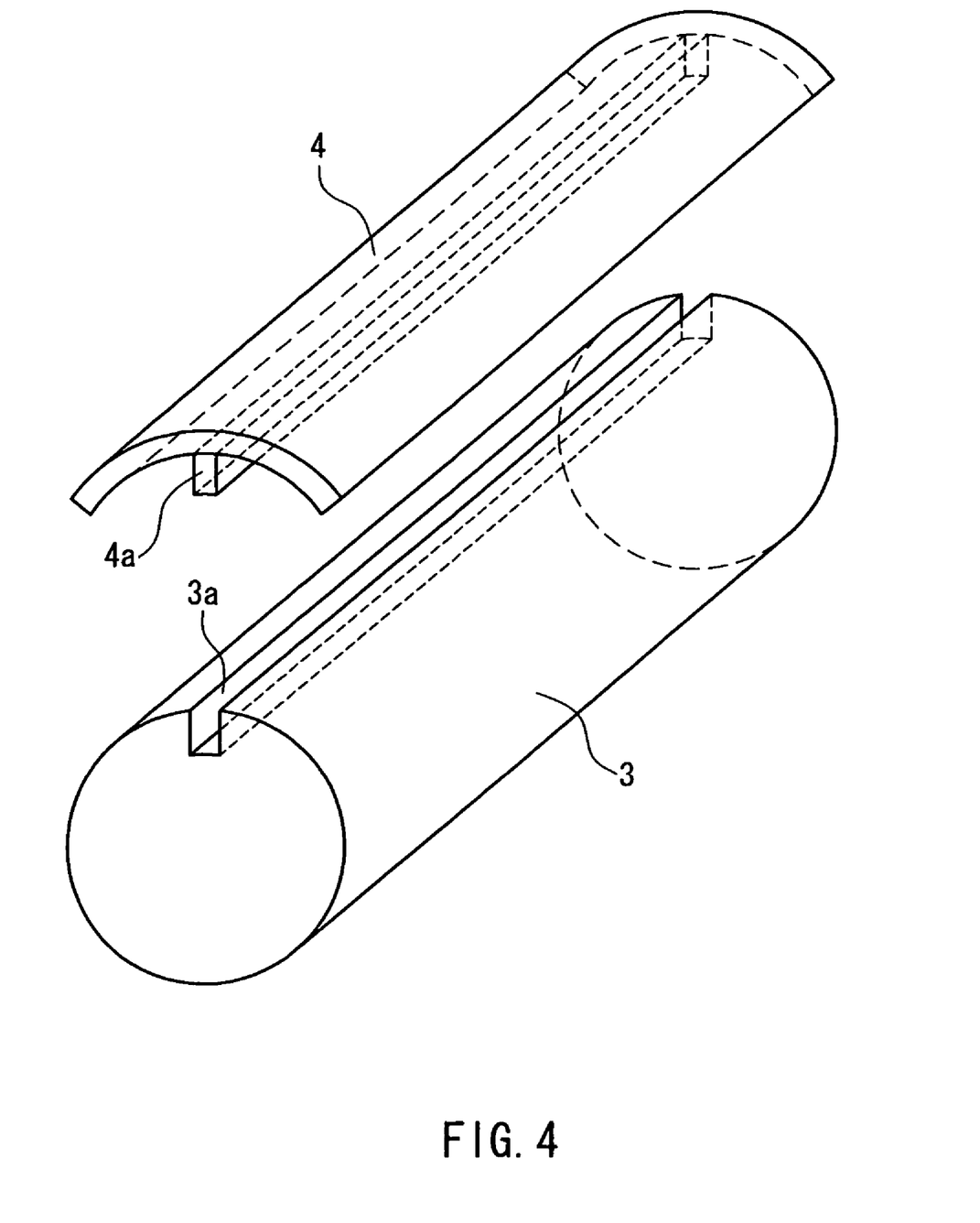
FIG. 4 is a perspective view that shows another example of a motor roller and contact plate of a film peeling device according to one embodiment of the present invention.
Figure 5:
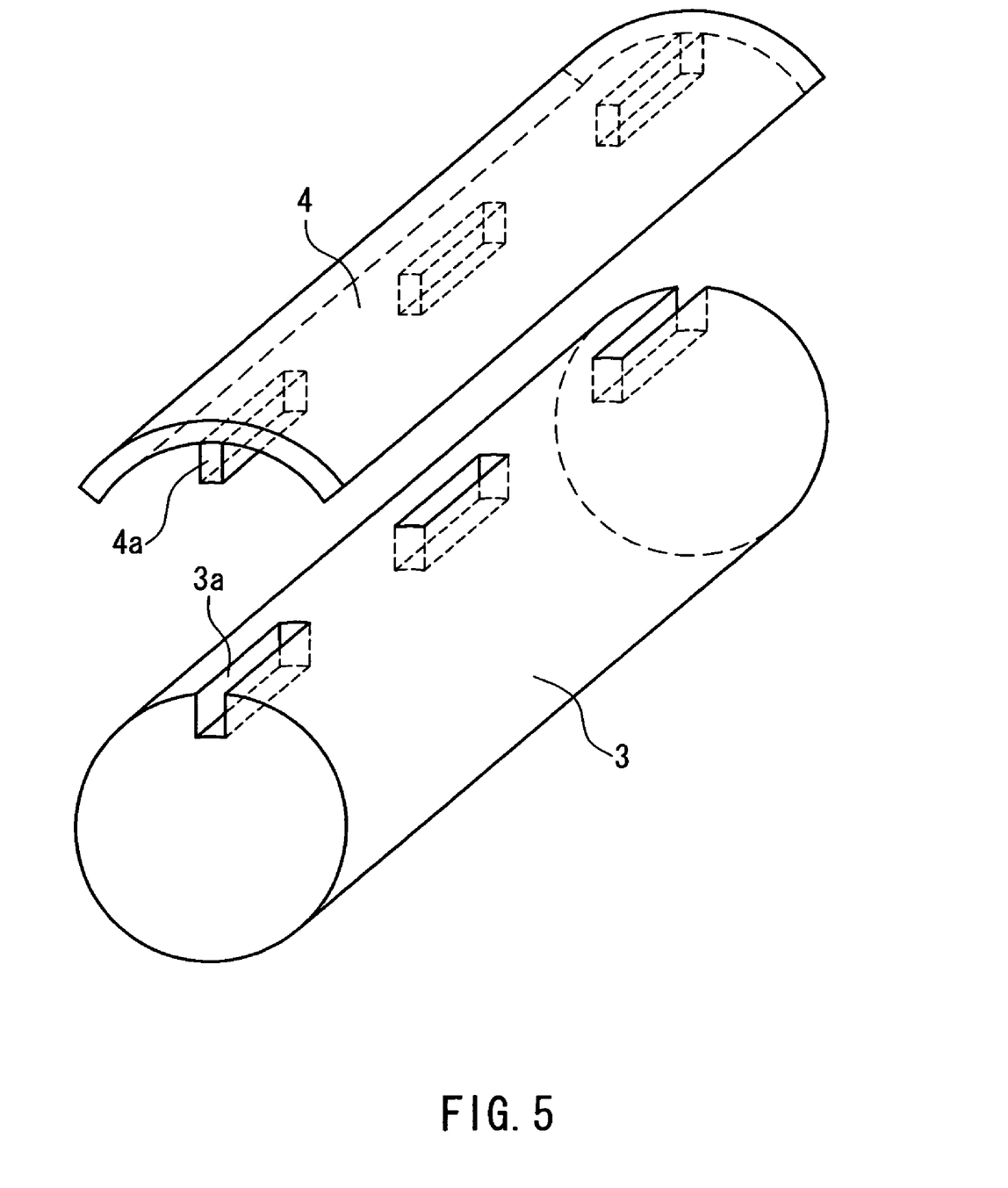
FIG. 5 is a perspective view that shows still another example of a motor roller and contact plate of a film peeling device according to one embodiment of the present invention.
Figure 6A:
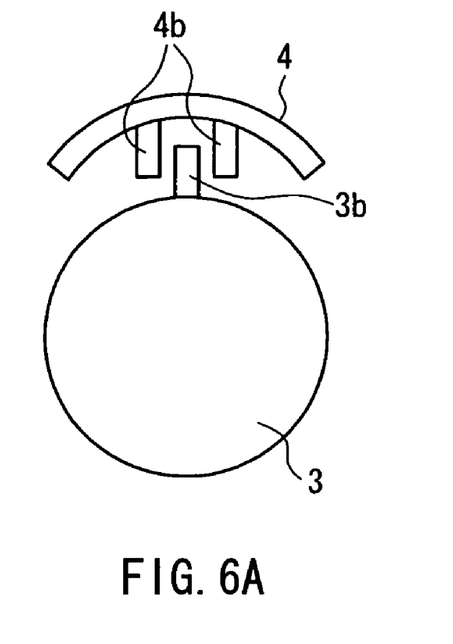
FIGS. 6A to 6D are side views that show examples of various combinations of a motor roller and contact plate of a film peeling device according to one embodiment of the present invention.
Figure 6B:
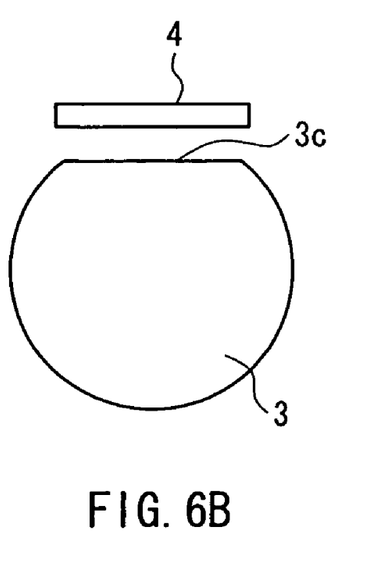
Figure 6C:
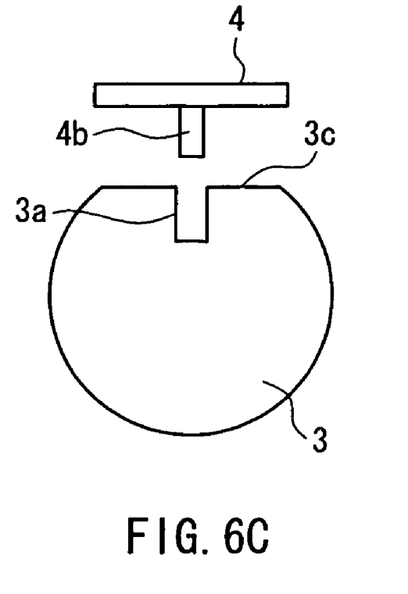
Figure 6D:
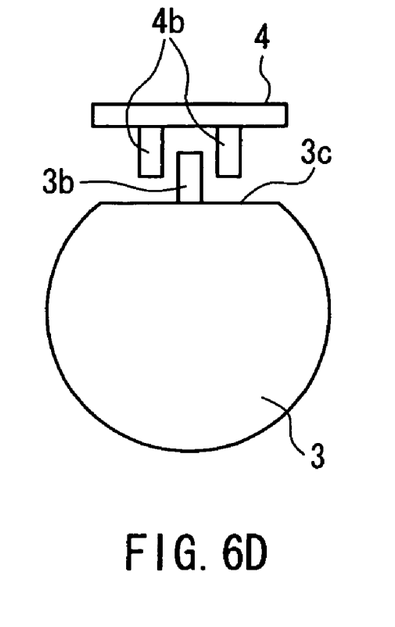

Also, in the embodiment above, a combination of the cylindrical motor roller 3 and the contact plate 4 with an arc-shaped cross-section having a curvature about the same as the curvature of the outer circumferential face of the motor roller 3 was described by way of example, but the present invention is not necessarily limited to a combination of the motor roller 3 and the contact plate 4 with that form. For example, as shown in FIG. 4, a configuration may also be adopted in which a cylindrical motor roller 3 in which a concave groove 3a is formed in the lengthwise direction, and a contact plate 4 with an arc-shaped cross-section having a curvature about the same as the curvature of the outer circumferential face of the motor roller 3, in which a convexity 4a that can be inserted into the concave groove 3a is formed in the lengthwise direction, are combined. With this combination, it is possible to grasp the end of the film 11 firmly, and so it is possible to peel off the film 11 from the face panel 7a reliably. Also, as shown in FIG. 5, the concave groove 3a and the convexity 4a may be divided into a plurality of sections.

As a combination of the motor roller 3 and the contact plate 4 that produces the above sort of effect, other various modes are conceivable. This is shown in FIG. 6. In the combination shown in FIG. 6A, a convexity 3b is formed in the lengthwise direction in the cylindrical motor roller 3, and a groove portion constituted from a pair of convexities 4b into which the convexity 3b can be inserted is formed in the lengthwise direction in the contact plate 4 with an arc-shaped cross-section. In the combination shown in FIG. 6B, a flat portion 3c is formed in the lengthwise direction in the cylindrical motor roller 3, and the contact plate 4 is formed in a flat shape corresponding to the flat portion 3c. In the combination shown in FIG. 6C, along with the flat portion 3c being formed in the lengthwise direction in the cylindrical motor roller 3, the concave groove 3a is formed in the lengthwise direction in the flat portion 3c, and along with the contact plate 4 being formed in a flat shape corresponding to the flat portion 3c, a convexity 4b that can be inserted into the concave groove 3a is formed in the lengthwise direction in the contact plate 4. In the combination shown in FIG. 6D, along with the flat portion 3c being formed in the lengthwise direction in the cylindrical motor roller 3, the convexity 3b is formed in the lengthwise direction in the flat portion 3c, and along with the contact plate 4 being formed in a flat shape corresponding to the flat portion 3c, a groove portion constituted from a pair of convexities 4b into which the convexity 3b can be inserted is formed in the lengthwise direction in the contact plate 4.

Figure 7A:
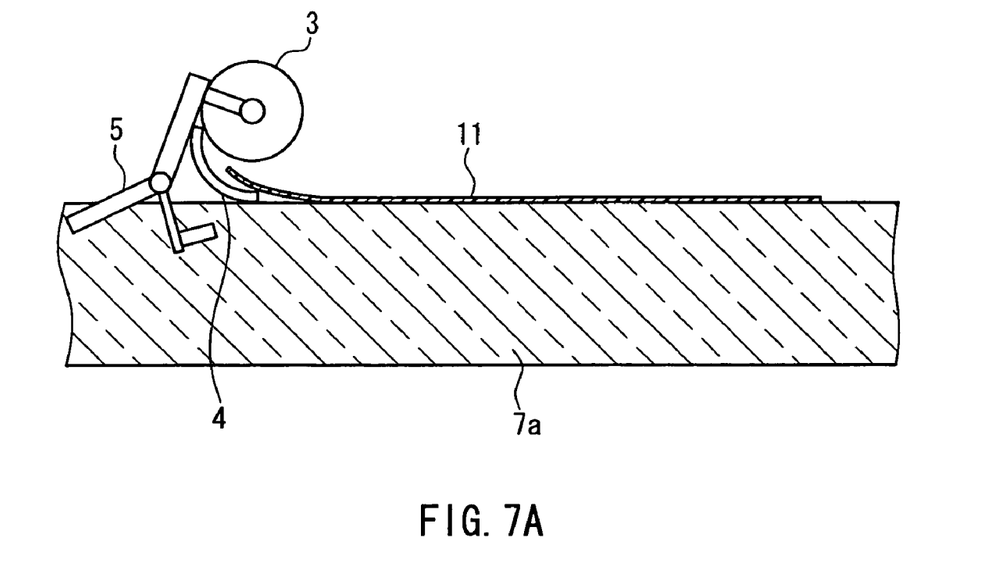
FIG. 7A is a side view that shows a state prior to grasping of another example of a film grasping mechanism of a film peeling device according to one embodiment of the present invention.
Figure 7B:
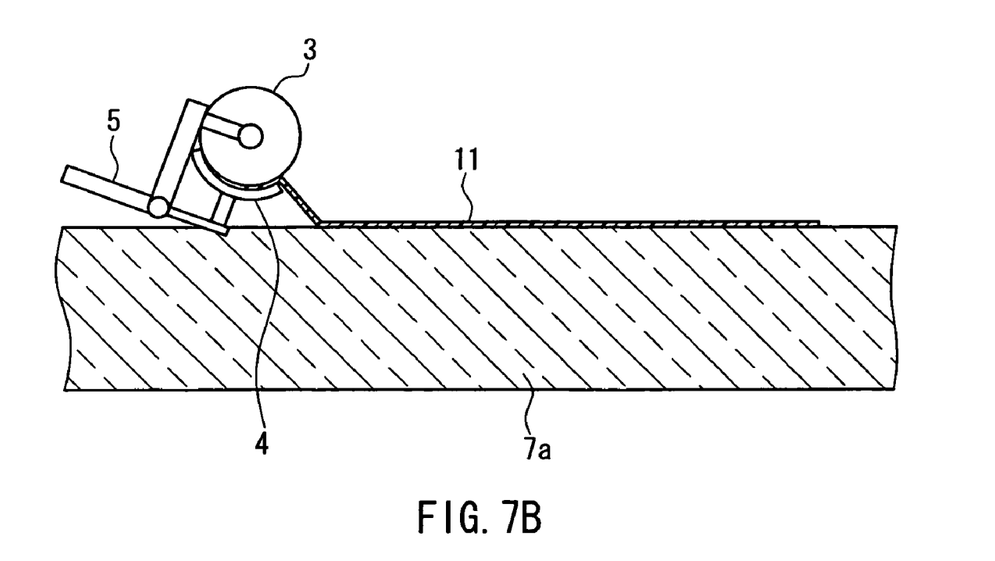
FIG. 7B is a side view that shows a state when the film grasping mechanism is grasping.

Also, in the above embodiment, the contact plate 4 is pressed against the outer circumferential face of the motor roller 3 from above (see FIGS. 3A and 3B), but as shown in FIG. 7, a configuration may also be adopted in which a film grasping mechanism constituted from the motor roller 3, the contact plate 4, and the toggle clamps 5 is disposed rotated to the left 160° from the state in FIG. 3, and the contact plate 4 is pressed against the outer circumferential face of the motor roller 3 from below. If a configuration is adopted in which the contact plate 4 is pressed against the outer circumferential face of the motor roller 3 from below, it is possible to bring the pressed face and the end of the film 11 close together, and so it is possible to reduce the amount of the end of the film 11 that is peeled manually by the worker. As a result, it is possible to reduce the burden on the worker, and the film 11 that has been stuck on the face panel 7a can be peeled more easily.

Figure 8:
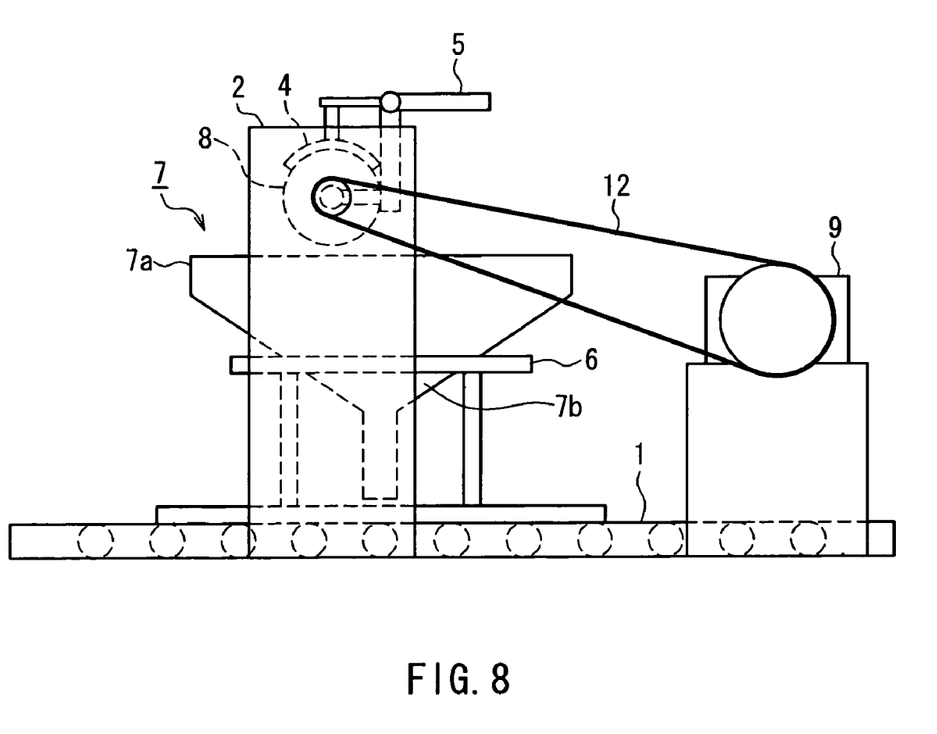
FIG. 8 is a side view that shows another example of a film peeling device according to one embodiment of the present invention.

Also, in the embodiment above, a configuration using a motor roller 3 having a self-rotating function was described by way of example, but the present invention is not necessarily limited to this configuration. As shown in FIG. 8, a configuration may also be adopted that uses simply a roller 8 instead of the motor roller 3. In this case, the roller 8 is joined to a drive motor 9 via a transmission belt 12. By turning on a switch for the drive motor 9, it is possible to rotationally drive the roller 8. In this case as well, the modifications as shown in FIGS. 4 to 6 can be added to the roller 8 and the contact plate 4.

Figure 9A:
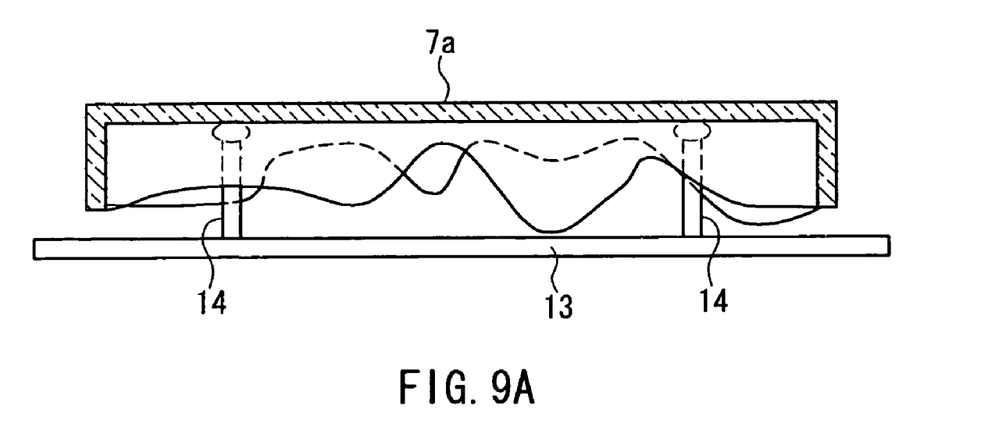
FIG. 9A is a side view that shows a transport pallet and face panel when peeling off a film in a state with only a face panel according to one embodiment of the present invention.
Figure 9B:
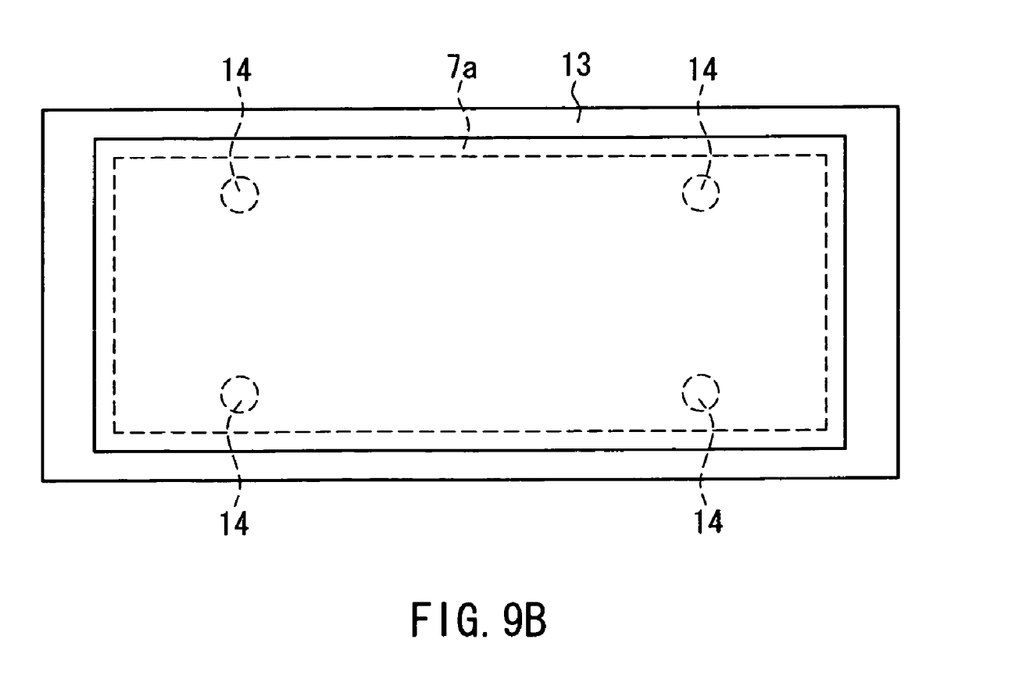
FIG. 9B is a plan view that shows the transport pallet and face panel.

Also, in the embodiment above, a configuration is adopted in which, in a state with the face panel 7a and the funnel 7b being a single body in the bulb 7, the film 11 that has been stuck on the face panel 7a is peeled, but a configuration may also be adopted in which, as shown in FIGS. 9A and 9B, in a state with only the face panel 7a, the film 11 that has been stuck on the face panel 7a is peeled. The face panel 7a is ordinarily severed using an electrically heated wire and separated from the bulb 7. In this case, the shape of the severed face is often irregular, and so by placing the face panel 7a on the flat transport pallet, the face on which the film 11 has been stuck slants, and so it is not possible to smoothly perform work to peel off the film 11. Accordingly, in this case, four support pins 14 are planted near the four corners of the flat transport pallet 13, and by the four support pins 14, the face panel 7a is supported in a state with its surface facing upward. Thus, regardless of the shape of the severed face of the face panel 7a, it is possible to keep a horizontal state for the face on which the film 11 has been stuck. The number of support pins 14 is not limited to four, and may be any number of pins as long as it is possible to keep a horizontal state for the face of the face panel 7a on which the film 11 has been stuck.

Also, in the embodiment above, as a display panel, the face panel 7a constituting the bulb 7 of a cathode ray tube was described by way of example, but the present invention is not limited to a method and device that peel off the film 11 that has been stuck on the face panel 7a. For example, it is also possible to apply the present invention when peeling off a deflecting film or protective film that has been stuck on the front and rear faces of a PDP or LCD panel. The film peeling method and film peeling device of the above embodiment also can be applied when peeling off, other than film of a display panel, for example, color film or the like that has been stuck on automobile glass.

INDUSTRIAL APPLICABILITY

According to the film peeling method and the film peeling device of the present invention, for example, film that has been firmly stuck on a display panel with the passage of ten years can be easily peeled, it is possible to improve the recycle rate of television receivers, and by extension to make a contribution to the effective application of earth resources, so the industrial utility value of the present invention is extremely high.

The invention claimed is:

1. A film peeling method for peeling off a film on a surface of a display panel of a display comprising a bulb and a display panel on which a film has been stuck, the method making use of a film peeling device that comprises:
    a transport pallet on which the display panel on which a film has been stuck is to be mounted;
    a supporting member on the transport pallet for supporting the display panel in a state with an outer surface of the display panel facing upward;
    a transport system for transporting the transport pallet;
    a cylindrical roller that has a self-rotating function disposed above the transport system; and
    a contact plate that is provided openably and closably on the outer surface of the roller, having a convexity formed in its inner surface in a lengthwise direction, and wherein the contact plate is pressed against the outer surface of the roller so as to that the end of the film is able to be inserted between the roller and the inner surface of the contact plate and be grasped between the outer surface of the roller and the inner surface of the contact plate;

where effective lengths of the roller and the contact plate are made longer than the length of the short side of the display panel, and the method comprising:
    separating the display panel from a bulb of the display,
    placing the display panel on the supporting member,
    peeling off an end of the film that has been stuck on the display panel, inserting the end of the peeled film between the outer surface of the roller and the contact plate and pressing the contact plate against the outer surface of the roller, and
    subsequently rotating the roller and at the same time moving the transport pallet on which the display panel is mounted by use of the transport system so as to peel off the film on the surface of the display panel.

2. The film peeling method according to claim 1, wherein the supporting member comprises a plurality of supporting pins on which an inner surface of the display panel rests.

3. The film peeling method according to claim 2, wherein the plurality of supporting pins are disposed at corners of the transport pallet.

4. The film peeling method according to claim 2, wherein the support pins support the display panel so that the outer surface is oriented horizontally.

* * * * *